(12) United States Patent
Ruan

(10) Patent No.: US 10,831,415 B2
(45) Date of Patent: Nov. 10, 2020

(54) TERMINAL DEVICE AND NON-TRANSITORY COMPUTER-READABLE MEDIUM STORING COMPUTER-READABLE INSTRUCTIONS FOR TERMINAL DEVICE

(71) Applicant: BROTHER KOGYO KABUSHIKI KAISHA, Nagoya (JP)

(72) Inventor: Longlong Ruan, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 16/288,265

(22) Filed: Feb. 28, 2019

(65) Prior Publication Data
US 2019/0272127 A1  Sep. 5, 2019

(30) Foreign Application Priority Data
Mar. 2, 2018  (JP) .................................. 2018-037899

(51) Int. Cl.
G06F 3/12 (2006.01)
H04N 1/00 (2006.01)

(52) U.S. Cl.
CPC .......... *G06F 3/1205* (2013.01); *G06F 3/1236* (2013.01); *G06F 3/1258* (2013.01);
(Continued)

(58) Field of Classification Search
CPC .... G06F 3/1292; G06F 3/1293; G06F 3/1205; G06F 3/1236; G06F 3/1258;
(Continued)

(56) References Cited

U.S. PATENT DOCUMENTS

2009/0066998 A1* 3/2009 Kato ...................... G01C 21/26
358/1.15
2013/0229684 A1* 9/2013 Yasuzaki ................ H04N 1/001
358/1.15
(Continued)

FOREIGN PATENT DOCUMENTS

JP  2001-111760 A  4/2001
JP  2013-214804 A  10/2013
(Continued)

OTHER PUBLICATIONS

"Wi-Fi Peer-to-Peer (P2P) Technical Specification Version 1.1", published by the Wi-Fi Alliance.

*Primary Examiner* — Chad Dickerson
(74) *Attorney, Agent, or Firm* — Scully, Scott, Murphy & Presser, PC

(57) ABSTRACT

A terminal device may display a setting screen for inputting setting information; after the setting information is inputted in the setting screen, supply a communication executing instruction to an OS program. The OS program may supply a signal sending instruction to a first wireless interface. The first wireless interface may start sending a polling signal, establish a first wireless connection with a function executing device, and communicate connection information with the function executing device by using the first wireless connection. The OS program may establish, by using the connection information, a second wireless connection for communicating with the function executing device via a second wireless interface. In a case where the second wireless connection is established, the terminal device may send a function executing request to the function executing device via the second wireless interface by using the second wireless connection.

7 Claims, 6 Drawing Sheets

(52) U.S. Cl.
CPC ....... *G06F 3/1292* (2013.01); *H04N 1/00307* (2013.01); *H04N 2201/006* (2013.01)

(58) Field of Classification Search
CPC ..... H04W 40/00; H04W 40/02; H04W 40/34; H04W 40/36; H04W 4/80; H04N 1/00127; H04N 1/00307; H04N 1/00339; H04N 1/00342; H04N 2201/006
USPC ........ 358/1.11–1.18, 400–404; 709/201–203
See application file for complete search history.

(56) References Cited

U.S. PATENT DOCUMENTS

| | | | |
|---|---|---|---|
| 2013/0229690 A1* | 9/2013 | Sumita | H04N 1/00408 358/1.15 |
| 2013/0260683 A1* | 10/2013 | Suzuki | H04N 1/00307 455/41.1 |
| 2015/0304805 A1 | 10/2015 | Suzuki et al. | |
| 2016/0286343 A1* | 9/2016 | Terashita | H04N 1/32518 |
| 2016/0286344 A1* | 9/2016 | Terashita | H04N 1/3278 |
| 2017/0034368 A1 | 2/2017 | Mihira | |
| 2017/0208431 A1 | 7/2017 | Suzuki et al. | |

FOREIGN PATENT DOCUMENTS

| | | |
|---|---|---|
| JP | 2016-139917 A | 8/2016 |
| JP | 2017-034379 A | 2/2017 |

\* cited by examiner

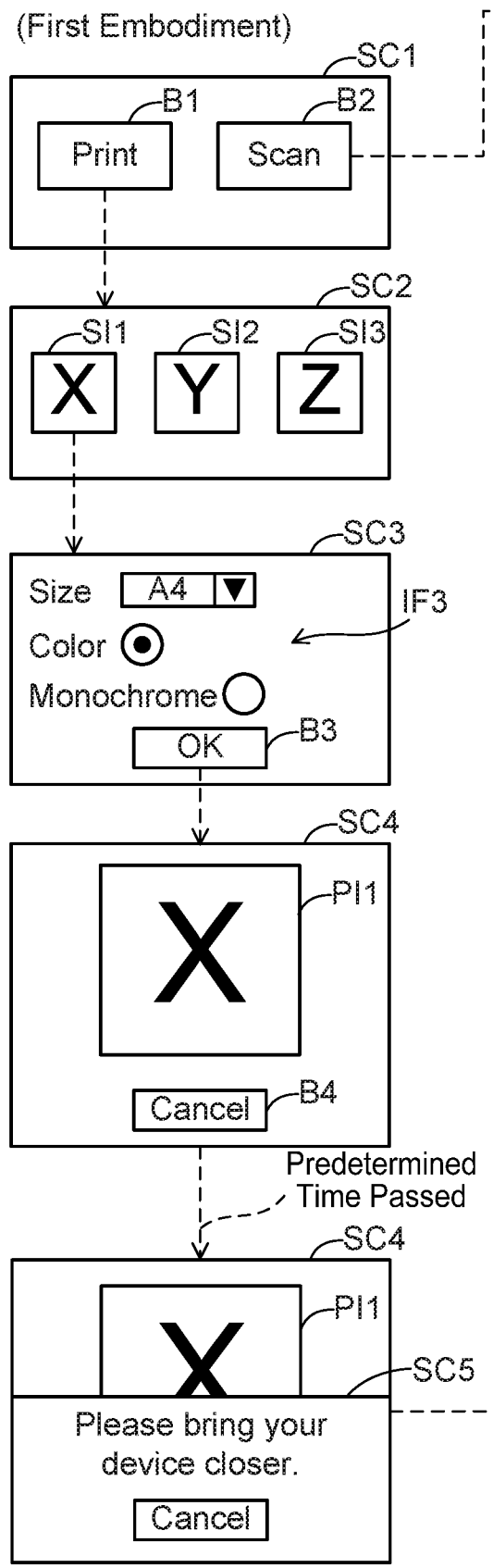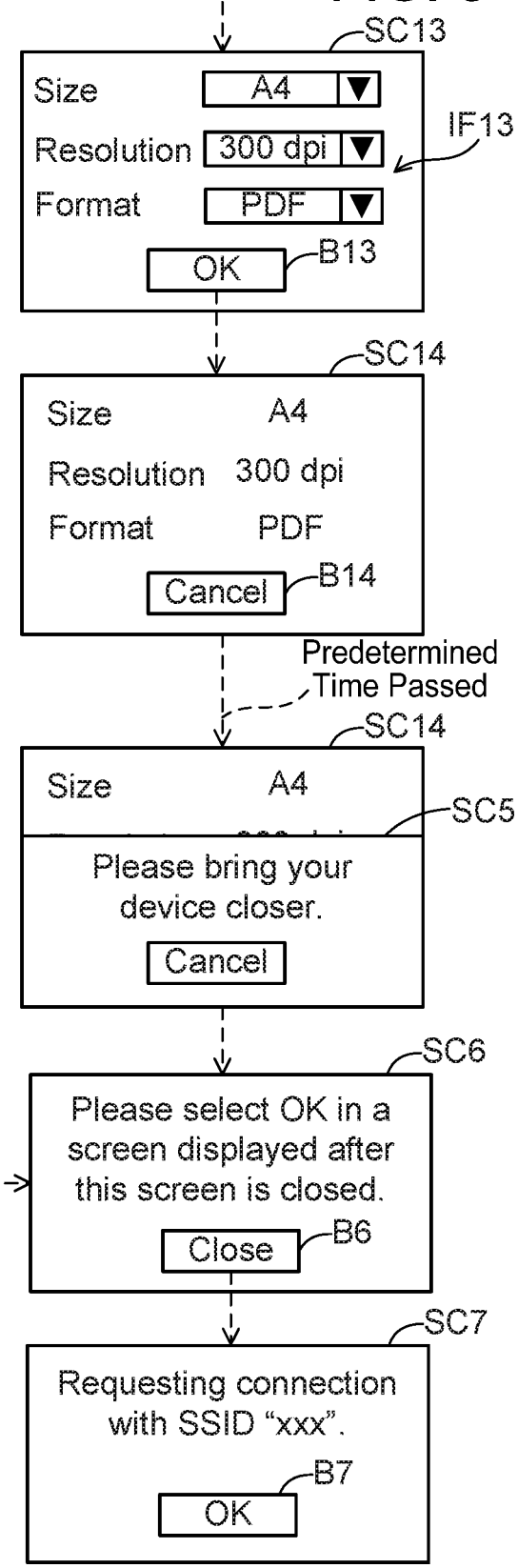
FIG. 3

TERMINAL DEVICE AND NON-TRANSITORY COMPUTER-READABLE MEDIUM STORING COMPUTER-READABLE INSTRUCTIONS FOR TERMINAL DEVICE

CROSS-REFERENCE TO RELATED APPLICATION

This application claims priority to Japanese Patent Application No. 2018-37899 filed on Mar. 2, 2018, the contents of which are hereby incorporated by reference into the present application.

TECHNICAL FIELD

The disclosure herein discloses a technique for sending a function executing request to a function executing device.

DESCRIPTION OF RELATED ART

A technique for sending print data from a portable terminal to a multifunction peripheral (MFP) is known. A user operates the portable terminal to activate an application program for generating a printing instruction, and brings the portable terminal close to the MFP. In this case, a Near Field Communication (NFC) connection is established between the portable terminal and the MFP. The portable terminal sends the printing instruction to the MFP by using the NFC connection, receives a Service Set Identifier (SSID) and the like from the MFP, and establishes a Wi-Fi Direct (registered trademark; WFD) connection with the MFP by using the received SSID and the like. By doing so, the portable terminal can send the print data to the MFP by using the WFD connection.

SUMMARY

In the above technique, there is no consideration regarding the user inputting setting information for printing (such as a paper size, color/monochrome, etc.). If the WFD connection is established before the setting information is inputted by the user, the print data may be sent to the MFP by using default setting information, for example, as a result of which printing according to setting information differing from what the user had intended may be executed.

The disclosure herein provides a technique for causing a function executing device to execute a specific function according to setting information inputted by a user.

A non-transitory computer-readable medium storing computer-readable instructions for a terminal device is disclosed herein. The computer-readable instructions, when executed by a processor of the terminal device, may cause the terminal device to: in a case where an instruction for using a specific function executable by a function executing device is inputted, cause a display unit of the terminal device to display a setting screen for inputting setting information for executing the specific function; after the setting information is inputted in the setting screen, supply a communication executing instruction to an operating system (OS) program of the terminal device, the communication executing instruction being for instructing to execute communication via a first wireless interface of the terminal device, the communication executing instruction being not supplied to the OS program before the setting information is inputted in the setting screen, wherein the OS program supplies a signal sending instruction to the first wireless interface in response to obtaining the communication executing instruction, the first wireless interface starts sending a polling signal in response to obtaining the signal sending instruction, establishes a first wireless connection with the function executing device in response to sending the polling signal to the function executing device, and communicates connection information with the function executing device by using the first wireless connection, and the OS program establishes, by using the connection information, a second wireless connection for communicating with the function executing device via a second wireless interface of the terminal device, the second wireless interface being different from the first wireless interface; and in a case where the second wireless connection is established, send a function executing request to the function executing device via the second wireless interface by using the second wireless connection, the function executing request being for causing the function executing device to execute the specific function according to the setting information.

The above terminal device itself and a control method implemented by the terminal device are also novel and useful.

BRIEF DESCRIPTION OF THE DRAWINGS

FIG. 3 shows screens displayed in a portable terminal.

EMBODIMENTS

Figure 1:
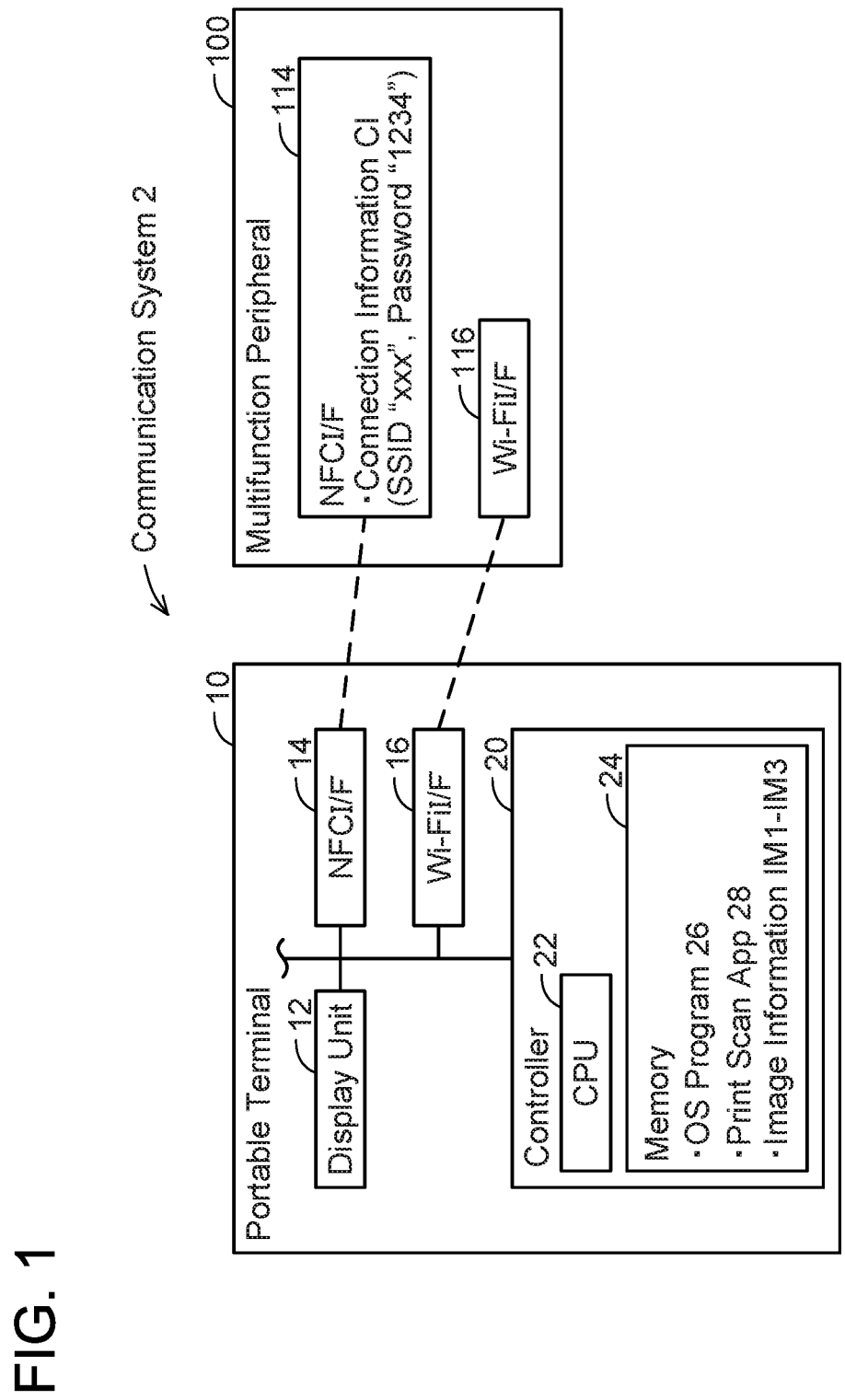
FIG. 1 shows a configuration of a communication system.

First Embodiment (Configuration of Communication System 2; FIG. 1)
As shown in FIG. 1, a communication system 2 includes a portable terminal 10 and a multifunction peripheral 100. Each of the devices 10, 100 is configured to execute wireless communication according to a Near Field Communication (NFC) scheme (that is, a kind of so-called near-range wireless communication) and wireless communication according to a Wi-Fi scheme with each other.

(Configuration of Multifunction Peripheral 100)
The multifunction peripheral 100 is a peripheral (that is, a peripheral of the portable terminal 10) capable of executing multiple functions including a print function and a scan function. The multifunction peripheral 100 includes an NFC interface 114 and a Wi-Fi interface 116. Hereinbelow, an interface may be denoted "I/F".

The Wi-Fi I/F 116 is an I/F configured to execute wireless communication according to the Wi-Fi scheme. The Wi-Fi scheme is a wireless communication scheme for executing wireless communication according to 802.11 standard of IEEE (the Institute of Electrical and Electronics Engineers, Inc.) and standards complying thereto (such as 802.11a, 11b, 11g, 11n, etc.). The Wi-Fi I/F 116 especially supports a Wi-Fi Direct (registered trademark; WFD) scheme established by the Wi-Fi Alliance. The WFD scheme is a wireless communication scheme described in the standard "Wi-Fi Peer-to-Peer (P2P) Technical Specification Version 1.1" published by the Wi-Fi Alliance.

The multifunction peripheral 100 is configured to operate in one of a Group Owner (G/O) state, a Client (CL) state, and a device state of the WFD scheme. The multifunction peripheral 100 can operate as a G/O of the WFD scheme and create a Wi-Fi network to which the multifunction peripheral 100 and an external device (such as the portable terminal 10) belong. In this case, the multifunction peripheral 100 can cause the external device to participate in the Wi-Fi network as a child station. In a variant, the multifunction peripheral 100 may operate as a SoftAP and create a network to which the multifunction peripheral 100 and an external device belong.

The NFC I/F 114 is a wireless I/F for executing wireless communication according to the NFC scheme. The NFC scheme is, for example, a wireless communication scheme based on the international standard ISO/IEC 21481 or 18092. The NFC I/F 114 is an NFC forum tag. The NFC forum tag is an interface that functions as an Integrated Circuit (IC) tag according to the NFC scheme. In a case of receiving a polling signal from an external device (such as the portable terminal 10), the NFC I/F 114 sends a response signal to the polling signal to the external device and establishes an NFC connection with the external terminal.

The NFC I/F 114 stores connection information CI. The connection information CI is information for causing an external device to participate in the Wi-Fi network in which the multifunction peripheral 100 operates as a parent station, and includes a Service Set Identifier (SSID) "xxx" for identifying the Wi-Fi network and a password "1234". The SSID "xxx" and the password "1234" are generated by the multifunction peripheral 100 and stored in the NFC I/F 114.

Here, differences between the Wi-Fi I/F and the NFC I/F will be described. A communication speed of wireless communication via the Wi-Fi I/F (a maximum communication speed of 11 to 600 Mbps, for example) is faster than a communication speed of wireless communication via the NFC I/F (a maximum communication speed of 100 to 424 Kbps, for example). Further, a frequency used in wireless communication via the Wi-Fi I/F (2.4 GHz band or 5.0 GHz band, for example) is different from a frequency used in wireless communication via the NFC I/F (13.56 MHz band, for example). Further, a maximum distance with which wireless communication can be executed via the Wi-Fi I/F (about 100 m at maximum, for example) is greater than a maximum distance with which wireless communication can be executed via the NFC I/F (about 10 cm at maximum, for example).

(Configuration of Portable Terminal 10)

The portable terminal 10 is a mobile terminal such as a cellphone, a smartphone, and a tablet PC. The portable terminal 10 includes a display unit 12, an NFC I/F 14, a Wi-Fi I/F 16, and a controller 20. Each of the units 12 to 20 is connected to a bus line (to which a reference sign is not given).

The display unit 12 is a display for displaying various types of information. The display unit 12 functions as a so-called touch panel. That is, the display unit 12 functions also as an operation unit to be operated by a user.

The NFC I/F 14 is a wireless I/F for executing NFC communication according to the NFC scheme, and is an NFC forum device. The NFC forum device is an I/F configured to selectively operate in one of a Peer to Peer (P2P) mode, a Reader/Writer (R/W) mode, and a Card Emulation (CE) mode. The NFC I/F 14 is configured to operate at least in the R/W mode. In a case of operating in a Reader mode, the NFC I/F 14 is configured to read data from the NFC I/F 114 of the multifunction peripheral 100, that is, to receive data from the NFC I/F 114. Further, in a case of operating in a Writer mode, the NFC I/F 14 is configured to write data in the NFC I/F 114, that is, to send data to the NFC I/F 114.

The Wi-Fi I/F 16 is similar to the Wi-Fi I/F 116 of the multifunction peripheral 100. However, the Wi-Fi I/F 16 does not support the WFD scheme. The Wi-Fi I/F 16 can establish a wireless connection with the Wi-Fi I/F 116 of the multifunction peripheral 100 and participate in the Wi-Fi network, as the child station (so-called legacy), in which the printer 100 operates as the parent station.

The controller 20 includes a CPU 22 and a memory 24. The CPU 22 is configured to execute various processes according to programs 26, 28 stored in the memory 24. The memory 24 is constituted of a volatile memory, a nonvolatile memory and the like. The memory 24 stores an Operating System (OS) program 26 for implementing basic processes, a print scan application program (hereinbelow termed "print scan app") 28, and a plurality of image information (that is, plural image files) IM1 to IM3 representing plural images. In this embodiment, a situation is assumed in which the OS program 26 is iOS (registered trademark).

The print scan app 28 is a program provided by a vendor of the multifunction peripheral 100, and is a program for sending an executing request for causing the multifunction peripheral 100 to execute print or scan, to the multifunction peripheral 100. The print scan app 28 may be installed in the portable terminal 10 from a server (not shown) provided by the vendor on the Internet, or may be installed in the terminal device 10 from a medium shipped with the multifunction peripheral 100, for example.

Figure 2:
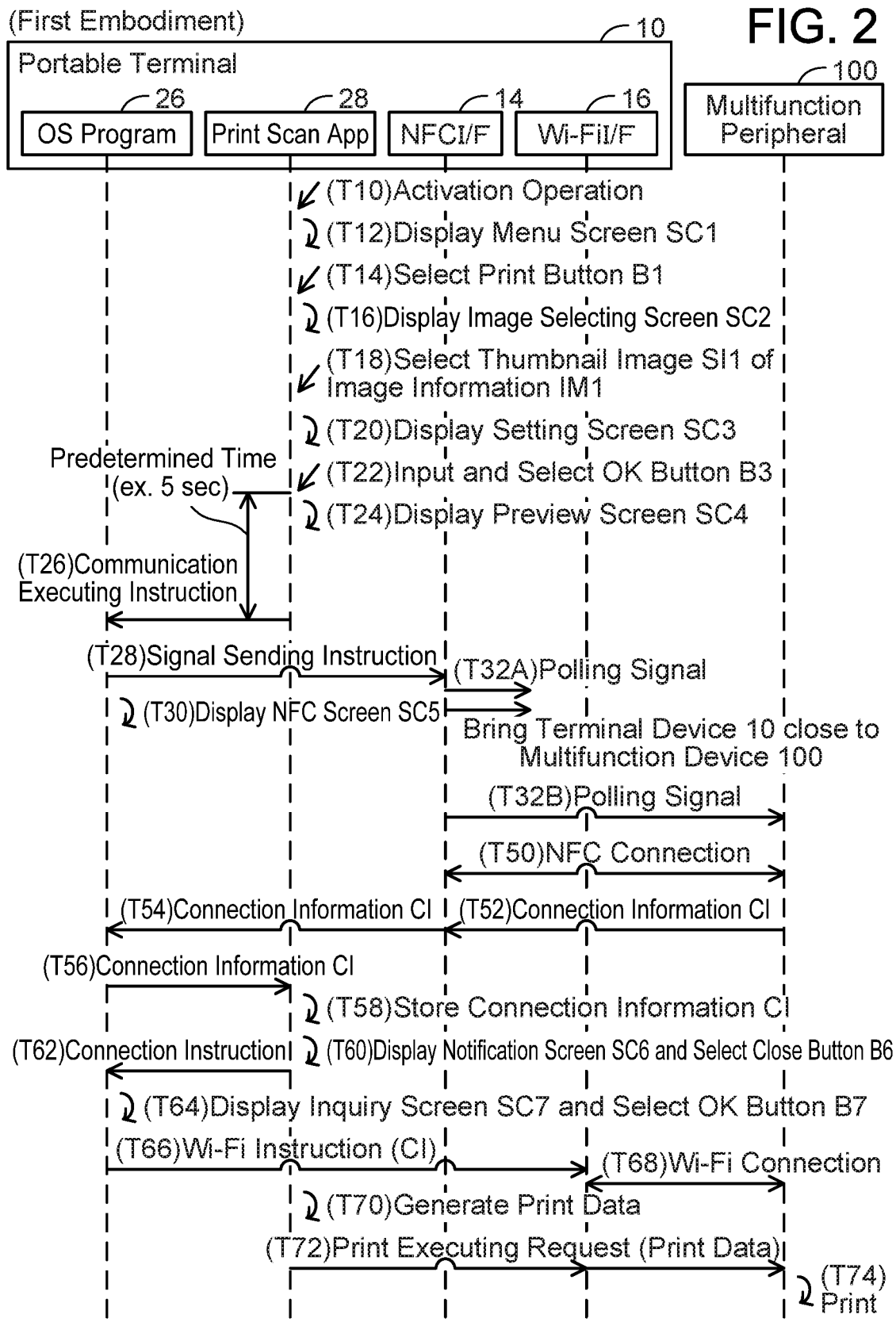
FIG. 2 shows a sequence diagram of a print process.

(Print Process; FIGS. 2 and 3)

A process through which the portable terminal 10 causes the multifunction peripheral 100 to execute printing will be described with reference to FIGS. 2 and 3. Hereinbelow, for easier understanding, processes which the CPU 22 of the portable terminal 10 executes in accordance with the OS program 26 will not be described with the CPU 22 as the subject of action, but with the OS program 26 as the subject of action. Further, similarly, processes which the CPU 22 executes in accordance with the print scan app 28 will not be described with the CPU 22 as the subject of action, but with the print scan app 28 as the subject of action.

In T10, an operation to activate the print scan app 28 (hereinbelow denoted as "app 28" in short) is performed on the portable terminal 10 by a user, as a result of which the app 28 is activated. In T12, the app 28 causes the display unit 12 to display a menu screen SC1. As shown in FIG. 3, the menu screen SC1 includes a print button B1 for accepting an instruction to use the print function of the multifunction peripheral 100 and a scan button B2 for accepting an instruction to use the scan function of the multifunction peripheral 100. In T14, the app 28 accepts a selection of the print button B1.

In T16, the app 28 causes the display unit 12 to display an image selecting screen SC2. The image selecting screen SC2 is a screen for selecting image information that represents an image to be printed by the multifunction peripheral 100. As shown in FIG. 3, the image selecting screen SC2 includes plural thumbnail images SI1 to SI3 represented by the plurality of image information IM1 to IM3 in the memory 24. In T18, the app 28 accepts from the user a selection of the thumbnail image SH represented by the image information IM1 from among the plural thumbnail images SI1 to SI3.

In T20, the app 28 causes the display unit 12 to display a setting screen SC3. The setting screen SC3 is a screen for inputting setting information for execution of the print function. As shown in FIG. 3, the setting screen SC3 includes input field IF3 and an OK button B3. The input field IF3 is a field for inputting plural setting values (such as paper size "A4" and color/monochrome "Color") corresponding to plural setting items (such as the paper size and color/monochrome) for execution of the print function. The OK button B3 is a button selected by the user when the input of the setting information is completed. In T22, the app 28 accepts the input of the setting information (that is, the plural setting values) and a selection of the OK button B3 from the user.

In T24, the app 28 causes the display unit 12 to display a preview screen SC4 including a preview image PI1 (see FIG. 3). Specifically, the app 28 converts the image information IM1 corresponding to the thumbnail image SI1 selected in T18 in accordance with the setting information inputted in the setting screen SC3 to generate preview image information representing an image to be printed in the multifunction peripheral 100. Then, the app 28 causes the display unit 12 to display the preview screen SC4 including the preview image PH represented by the generated preview image information. Further, the preview screen SC4 includes a cancel button B4. The cancel button B4 is a button for accepting an instruction to re-input setting information from the user. When the cancel button B4 is selected, the setting screen SC3 is displayed again. Further, the preview screen SC4 can accept a scale-changing operation for zooming the preview image PI1 in or out.

Further, in T26, the app 28 supplies a communication executing instruction to the OS program 26 with the selection of the OK button B3 in the setting screen SC3 as its trigger. In other words, the app 28 does not supply the communication executing instruction to the OS program 26 until the OK button B3 is selected in the setting screen SC3 since the app 28 was activated. The communication executing instruction is a command for instructing to send a polling signal via the NFC I/F 14. Here, the app 28 supplies the communication executing instruction to the OS program 26 after a predetermined time (such as 5 seconds) has elapsed since the preview screen SC4 began to be displayed on the display unit 12 (that is, since the OK button B3 was selected in the setting screen SC3). The predetermined time is preset by the vendor of the multifunction peripheral 100. Further, the predetermined time may be changed by updates or the like of the app 28 after the app 28 has been installed in the portable terminal 10. Further, the app 28 may pause counting the predetermined time while accepting the scale-changing operation in the preview screen SC4. Alternatively, the app 28 may erase count of the predetermined time in a case of accepting the scale-changing operation, and start counting the predetermined time again from a timing when the scale-changing operation has been terminated. Further, a configuration may be employed in which the communication executing instruction is not supplied to the OS program 26 in the case where the scale-changing operation is accepted, even if it is determined that the predetermined time has elapsed by termination of the count of the predetermined time. That is, in general, in a case where an operation from the user is accepted via the preview screen SC4, either of the configuration in which the count of the predetermined time is paused, the configuration in which the count of the predetermined time is erased, or the configuration in which the communication executing instruction is not supplied to the OS program 26 even if it is determined that the predetermined time has elapsed by termination of the count of the predetermined time.

When obtaining the communication executing instruction from the app 28 in T26, the OS program 26 supplies a signal sending instruction to the NFC I/F 14 in T28. The signal sending instruction is a command for causing the NFC I/F 14 to start sending a polling signal.

Further, when obtaining the communication executing instruction from the app 28 in T26, the OS program 26 causes the display unit 12 to display an NFC screen SC5 (see FIG. 3) in T30. The NFC screen SC5 is a screen indicating that communication via the NFC I/F 14 is executable, and specifically, it includes a message prompting the user to bring the portable terminal 10 close to the multifunction peripheral 100. As shown in FIG. 3, the NFC screen SC5 is displayed in front of the preview screen SC4. The NFC screen SC5 overlaps a part of the preview screen SC4 (that is, in an example of FIG. 3, a lower portion of the preview image PH and the cancel button B4). Due to this, when the NFC screen SC5 is displayed, a part of the preview screen SC4 becomes hidden. That is, the NFC screen SC5 is displayed preferentially over the preview screen SC4. Further, a screen that is displayed behind the NFC screen SC5 cannot accept an operation. Due to this, even if the NFC screen SC5 does not overlap the cancel button B4 of the preview screen SC4, the user cannot select the cancel button B4. Display of the NFC screen SC5 is executed by the OS program 26, and the app 28 cannot instruct the OS program 26 not to display the NFC screen SC5.

For example, a comparative example is assumed in which the communication executing instruction is supplied to the OS program 26 immediately after the preview screen SC4 is displayed. In this case, since the NFC screen SC5 is displayed by the OS program 26 immediately after the preview screen SC4 is displayed, the user cannot see a part of the preview screen SC4. In this embodiment, the communication executing instruction is supplied to the OS program 26 after the predetermined time has elapsed since the preview screen SC4 began to be displayed. Due to this, the NFC screen SC5 is not displayed until the predetermined time has elapsed since the preview screen SC4 began to be displayed, as a result of which the user can see an entirety of the preview screen SC4. In a variant, the configuration of the comparative example as above may be employed.

When the NFC I/F 14 obtains the signal sending instruction from the OS program 26 in T28, it starts sending a polling signal in T32A. The user sees the NFC screen SC5 displayed in the portable terminal 10 and brings the portable terminal 10 close to the multifunction peripheral 100. Due to this, in T32B, a distance between the NFC I/F 14 and the NFC I/F 114 of the multifunction peripheral 100 becomes a predetermined distance (such as 10 cm) or less, and thus the polling signal is received by the multifunction peripheral 100.

In T50, the NFC I/F 14 receives a response signal to the polling signal from the NFC I/F 114 of the multifunction peripheral 100 and establishes an NFC connection with the multifunction peripheral 100. In T52, the NFC I/F 14 operates in the Reader mode to read (that is, receive) the connection information CI from the NFC I/F 114 of the multifunction peripheral 100. Then, in TM, the NFC I/F 14 supplies the connection information CI to the OS program 26.

When the OS program 26 obtains the connection information CI from the NFC I/F 14 in T54, it supplies the obtained connection information CI to the app 28 in T56. Due to this, in T58, the app 28 stores the connection information CI obtained from the OS program 26 in the memory 24. In a variant, the process of T58 may be executed by the OS program 26.

In T60, the app 28 causes the display unit 12 to display a notification screen SC6 (see FIG. 3). The notification screen SC6 is a screen for notifying the user to select OK in an inquiry screen SC7 to be described later. Due to this, the user can be prompted to perform an appropriate operation.

In T62, the app 28 closes the notification screen SC6 in a case where a Close button B6 included in the notification screen SC6 is selected and supplies a connection instruction to the OS program 26. The connection instruction is a command for instructing to establish a wireless connection via the Wi-Fi I/F 16 (hereinbelow termed "Wi-Fi connection").

When obtaining the connection instruction from the app 28 in T62, the OS program 26 causes the display unit 12 to display the inquiry screen SC7 (see FIG. 3) in T64. The inquiry screen SC7 includes a message inquiring the user whether or not to connect to the Wi-Fi network identified by the SSID "xxx" and an OK button B7.

When the OS program 26 accepts a selection of the OK button B7 in T64, it supplies a Wi-Fi instruction to the Wi-Fi I/F 16 in T66. The Wi-Fi instruction is a command for causing the Wi-Fi I/F 16 to execute communication of various signals (such as an Authentication signal, an Association signal, a 4-way handshake, etc.) for establishing a Wi-Fi connection. The Wi-Fi instruction includes the connection information CI received in T54 and stored in the memory 24. In the course of the communication of the various signals, the password in the connection information CI is sent to the multifunction peripheral 100 and authentication of the password is executed by the multifunction peripheral 100. Due to this, the OS program 26 establishes a Wi-Fi connection with the multifunction peripheral 100 in T68. As a result, the portable terminal 10 participates as a child station (that is, a legacy) in the Wi-Fi network in which the multifunction peripheral 100 operates as the parent station.

When the Wi-Fi connection is established, in T70, the app 28 generates print data by converting the image information IM1 according to the setting information inputted in T22. The print data includes converted image information having a data format which is interpretable by the multifunction peripheral 100 and the setting information inputted in T22. In T72, the app 28 sends a print executing request including the generated print data to the multifunction peripheral 100 via the Wi-Fi I/F 16 by using the Wi-Fi connection established in T68. The print executing request is a request for causing the multifunction peripheral 100 to execute printing of an image according to the print data.

When the multifunction peripheral 100 receives the print executing request in T72 from the portable terminal 10, it executes printing of the image represented by the converted image information included in the print data in accordance with the setting information included in the print data in the print executing request in T74.

According to the process of FIG. 2, the portable terminal 10 does not supply the communication executing instruction to the OS program 26 before the setting information is inputted in the setting screen SC3. As such, a situation in which a Wi-Fi connection is established before the setting information is inputted by the user and the print executing request is sent to the multifunction peripheral 100 by using, for example, default setting information can be suppressed. The portable terminal 10 supplies the communication executing instruction to the OS program 26 (T26 of FIG. 2) in the case where the OK button B3 is selected after the setting information has been inputted in the setting screen SC3. Due to this, the signal sending instruction is supplied from the OS program 26 to the NFC I/F 14 (T28), the connection information CI is received from the multifunction peripheral 100 through the NFC I/F 14 (T56), and the Wi-Fi connection via the Wi-Fi I/F 16 is established (T68). As a result, the portable terminal 10 can send the print executing request for causing the multifunction peripheral 100 to execute printing in accordance with the setting information inputted by the user, to the multifunction peripheral 100 by using the Wi-Fi connection (T72).

(Scan Process)

Next, a process through which the portable terminal 10 causes the multifunction peripheral 100 to execute scanning will be described with reference to FIGS. 2 and 3. The app 28 executes similar processes to T10 and T12 of FIG. 2 to cause the display unit 12 to display the menu screen SC1 (see FIG. 3). The app 28 accepts a selection of the scan button B2 in the menu screen SC1, instead of T14 of FIG. 2. In this case, the app 28 causes the display unit 12 to display a setting screen SC13 (see FIG. 3), instead of T16 to T20. The setting screen SC13 includes an input field IF13 and an OK button B13. The input field IF13 is a field for inputting plural setting values (such as a paper size "A4", a resolution "300 dpi", and a data format "PDF") corresponding to plural setting items (such as the paper size, the resolution, and the data format) for executing the scan function. When the app 28 accepts a selection of the OK button B13 in the setting screen SC13 in T22, it causes the display unit 12 to display a setting confirmation screen SC14 (see FIG. 3), instead of T24. The setting confirmation screen SC14 is a screen indicating contents of the setting information (that is, the plural setting values) inputted in the setting screen SC13.

When the OK button B13 in the setting screen SC13 is selected, the app 28 supplies the communication executing instruction to the OS program 26 in T26 after a predetermined time has elapsed since the setting confirmation screen SC14 began to be displayed. Due to this, processes similar to T28 to T30 are executed, and the NFC screen SC5 is displayed preferentially over the setting confirmation screen SC14. Processes after the NFC screen SC5 is displayed are similar to T50 to T68 of FIG. 2.

When the Wi-Fi connection is established in T68, the app 28 sends a scan executing request to the multifunction peripheral 100 by using the Wi-Fi connection via the Wi-Fi I/F 16, instead of T70 and T72. The scan executing request is a request for causing the multifunction peripheral 100 to execute scanning of a document, and includes the setting information inputted in the setting screen SC13.

When the multifunction peripheral 100 receives the scan executing request from the portable terminal 10, it executes scanning of the document in accordance with the setting information in the scan executing request, and sends scan data representing a scanned image to the portable terminal 10 by using the Wi-Fi connection.

In the scan process above as well, the portable terminal 10 does not supply the communication executing instruction to the OS program 26 before the setting information is inputted in the setting screen SC13. As such, a situation in which a Wi-Fi connection is established before the setting information is inputted, a scan executing request including, for example, default setting information is sent to the multifunction peripheral 100, and scan data generated according to the default setting information is received from the multifunction peripheral 100 can be suppressed.

(Corresponding Relationships)

The portable terminal 10, the print scan app 28, the multifunction peripheral 100, and the print function or the scan function are respectively examples of "terminal device", "computer-readable instructions", "function executing device", and "specific function". The selection of the print button B1 or the scan button B2 in the menu screen SC1 in FIG. 3 is an example of an "instruction". The NFC I/F 14 and the Wi-Fi I/F 16 are respectively examples of "first wireless interface" and "second wireless interface". The connection information CI is an example of "connection information". The NFC connection in T50 and the Wi-Fi connection in T68 of FIG. 2 are respectively examples of "first wireless connection" and "second wireless connection". The print executing request or the scan executing request are examples of "function executing request". The preview screen SC4 or the setting confirmation screen SC14 in FIG. 3 are examples of "confirmation screen". The NFC screen SC5 is an example of "predetermined screen". T20, T26, and T72 of FIG. 2 are respectively examples of "causing a display unit to display a setting screen", "supplying a communication executing instruction to an OS program", and "sending a function executing request to a function executing device".

Second Embodiment

In this embodiment, a part of process which the CPU 22 of the portable terminal 10 executes according to the app 28 differs from that of the first embodiment.

Figure 4:
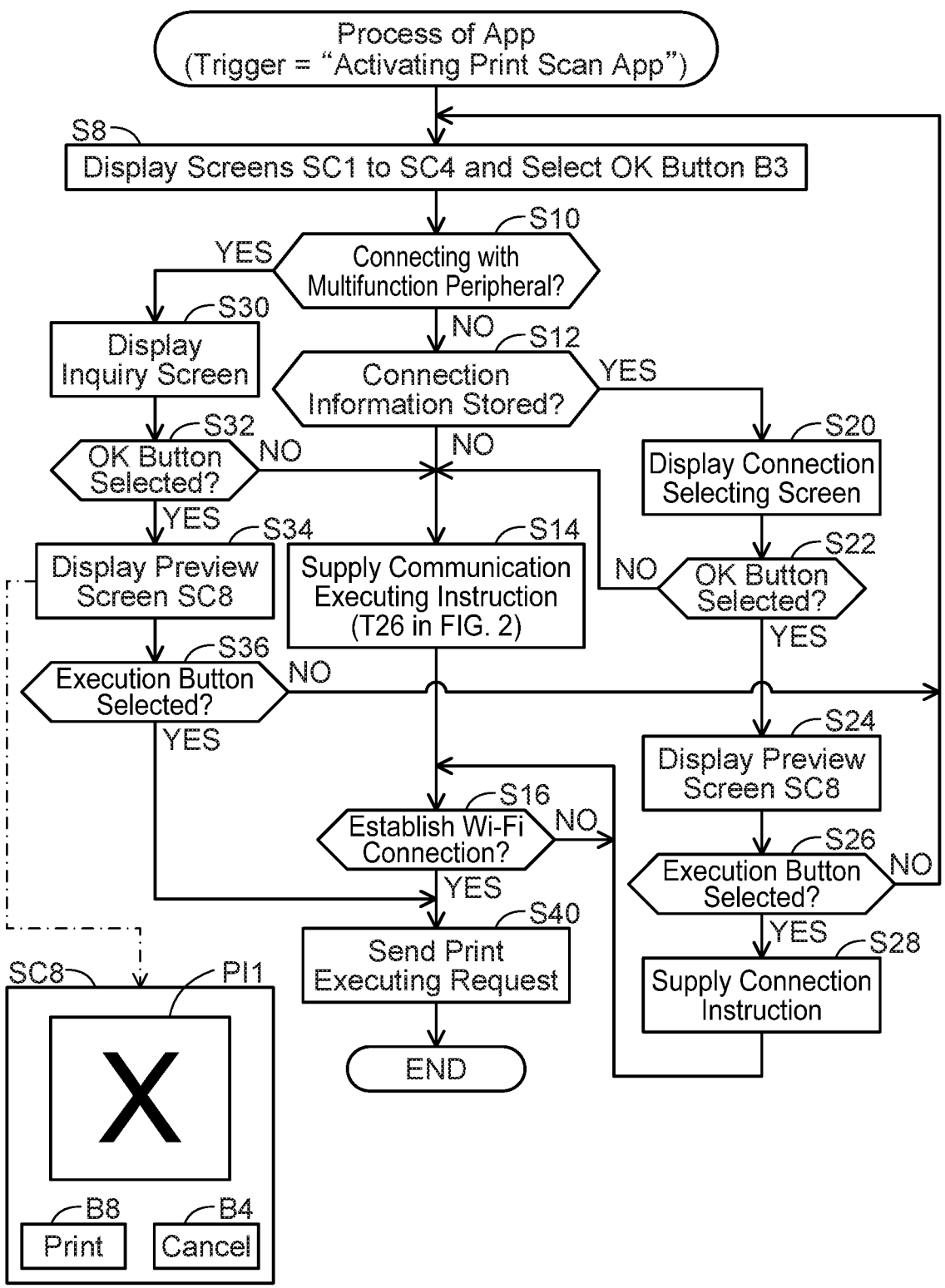
FIG. 4 shows a flowchart of a process of a terminal device according to a second embodiment.

(Process of Portable terminal 10; FIG. 4)

A process which the CPU 22 of the portable terminal 10 executes according to the app 28 will be described with reference to FIG. 4. The process of FIG. 4 is initiated with the activation of the app 28 as a trigger. Hereinbelow as well, processes which the CPU 22 executes according to the app 28 will not be described with the CPU 22 as the subject of action, but with the app 28 as the subject of action.

In S8, the app 28 causes the display units 12 to display the respective screens SC1 to SC4, similarly to T12 to T24 of FIG. 2. When the OK button B3 in the setting screen SC3 (see FIG. 3) is selected, the app 28 determines in S10 whether or not a Wi-Fi connection with a multifunction peripheral (such as 100) is currently established. Specifically, the app 28 supplies to the Wi-Fi I/F 16 an inquiry command for inquiring whether a Wi-Fi connection is currently established. In a case where a Wi-Fi connection is currently established, the Wi-Fi I/F 16 reads an SSID of a Wi-Fi network in which the portable terminal 10 is participating from a memory (not shown) of the Wi-Fi I/F 16, and supplies this SSID to the app 28 as a response to the inquiry command. In a case of obtaining the response including the SSID from the Wi-Fi I/F 16, the app 28 determines that the Wi-Fi connection is currently established with the multifunction peripheral. On the other hand, in a case where a response including an SSID is not obtained from the Wi-Fi I/F 16, the app 28 determines that no Wi-Fi connection is currently established with any multifunction peripheral.

In the case of determining that the Wi-Fi connection with the multifunction peripheral is currently established (YES in S10), the app 28 causes the display unit 12 to display an inquiry screen in S30. The inquiry screen is a screen for inquiring whether or not to use the multifunction peripheral with which the Wi-Fi connection is currently established (hereinbelow termed "target multifunction peripheral"). The inquiry screen includes an OK button for accepting a selection to use the target multifunction peripheral and a cancel button for accepting a selection not to use the target multifunction peripheral.

In S32, the app 28 determines whether or not the OK button in the inquiry screen is selected. In a case where the OK button in the inquiry screen is selected (YES in S32), the app 28 causes the display unit 12 to display a preview screen SC8 in S34, instead of the preview screen SC4 displayed in S8. The preview screen SC8 is similar to the preview screen SC4 except for including an execution button B8 for accepting an instruction to execute printing. On the other hand, the app 28 proceeds to S14 in a case where the cancel button in the inquiry screen is selected (NO in S32).

In S36, the app 28 determines whether or not the execution button B8 in the preview screen SC8 is selected. In a case where the execution button B8 in the preview screen SC8 is selected (YES in S36), the app 28 sends the print executing request to the target multifunction peripheral via the Wi-Fi I/F 16 by using the Wi-Fi connection in S40. When the process of S40 is completed, the process of FIG. 4 is completed. On the other hand, the app 28 returns to S8 in a case where the cancel button B4 in the preview screen SC8 is selected (NO in S36).

Further, in the case of determining that no Wi-Fi connection is currently established with any multifunction peripheral (NO in S10), the app 28 determines in S12 whether or not connection information (that is, an SSID and a password) that was used in the past to establish a Wi-Fi connection with a multifunction peripheral is stored in the memory 24. For example, in a case where the process of FIG. 4 is executed for the first time, no connection information is stored in the memory 24. On the other hand, in a case where it is the second or more times the process of FIG. 4 is executed and a process of S14 (to be described later) was executed when the process of FIG. 4 was executed for the first time, the connection information received from the multifunction peripheral 100 is stored in the memory 24 as a result of the process of T58 of FIG. 2 having been executed when the process of FIG. 4 was executed for the first time. In this case, the connection information that was used in the past is stored in the memory 24. The app 28 determines that there is a past record of a Wi-Fi connection having been established with a multifunction peripheral (hereinbelow termed "specific multifunction peripheral") in a case where connection information is stored in the memory 24 (YES in S12), and proceeds to S20.

In S20, the app 28 causes the display unit 12 to display a connection selecting screen. The connection selecting screen is a screen for allowing the user to select whether or not to establish a Wi-Fi connection with the specific multifunction peripheral. The connection selecting screen includes an OK button for accepting a selection to establish the Wi-Fi connection and a cancel button for accepting a selection not to establish the Wi-Fi connection. In a case where a plurality of connection information corresponding to plural multifunction peripherals is stored in the memory 24, the connection selecting screen may include a selection field for selecting one multifunction peripheral from among the plural multifunction peripherals.

In S22, the app 28 determines whether or not the OK button in the connection selecting screen is selected. In a case where the OK button in the connection selecting screen is selected (YES in S22), the app 28 proceeds to S24. S24 and S26 are similar to S34 and S36. On the other hand, in a case where the cancel button in the connection selecting screen is selected (NO in S22), the app 28 proceeds to S14.

In a case where the execution button B8 in the preview screen SC8 is selected (YES in S26), the app 28 supplies the connection instruction including the connection information in the memory 24 to the OS program 26 in S28. Due to this, the OS program 26 supplies the Wi-Fi instruction to the Wi-Fi I/F 16, and the Wi-Fi I/F 16 executes communication of various signals for establishing a Wi-Fi connection with the specific multifunction peripheral.

Next, the app 28 monitors in S16 whether or not the Wi-Fi connection is established with the specific multifunction peripheral. In a case where the Wi-Fi connection is established with the specific multifunction peripheral (YES in S16), the app 28 sends the print executing request to the specific multifunction peripheral in S40 by using the established Wi-Fi connection. The process of FIG. 4 is thereby completed.

Further, in a case of determining that no Wi-Fi connection is currently established with any multifunction peripheral (NO in S10) and determining that no connection information is stored in the memory 24 (NO in S12), the app 28 proceeds to S14. In S14, the app 28 supplies the communication executing instruction to the OS program 26. Due to this, processes similar to T28 to T68 of FIG. 2 are executed, and a Wi-Fi connection is thereby established. In this case, the app 28 sends the print executing request to the multifunction peripheral in S40 by using the established Wi-Fi connection. Due to this, the process of FIG. 4 is thereby completed.

Figure 5:
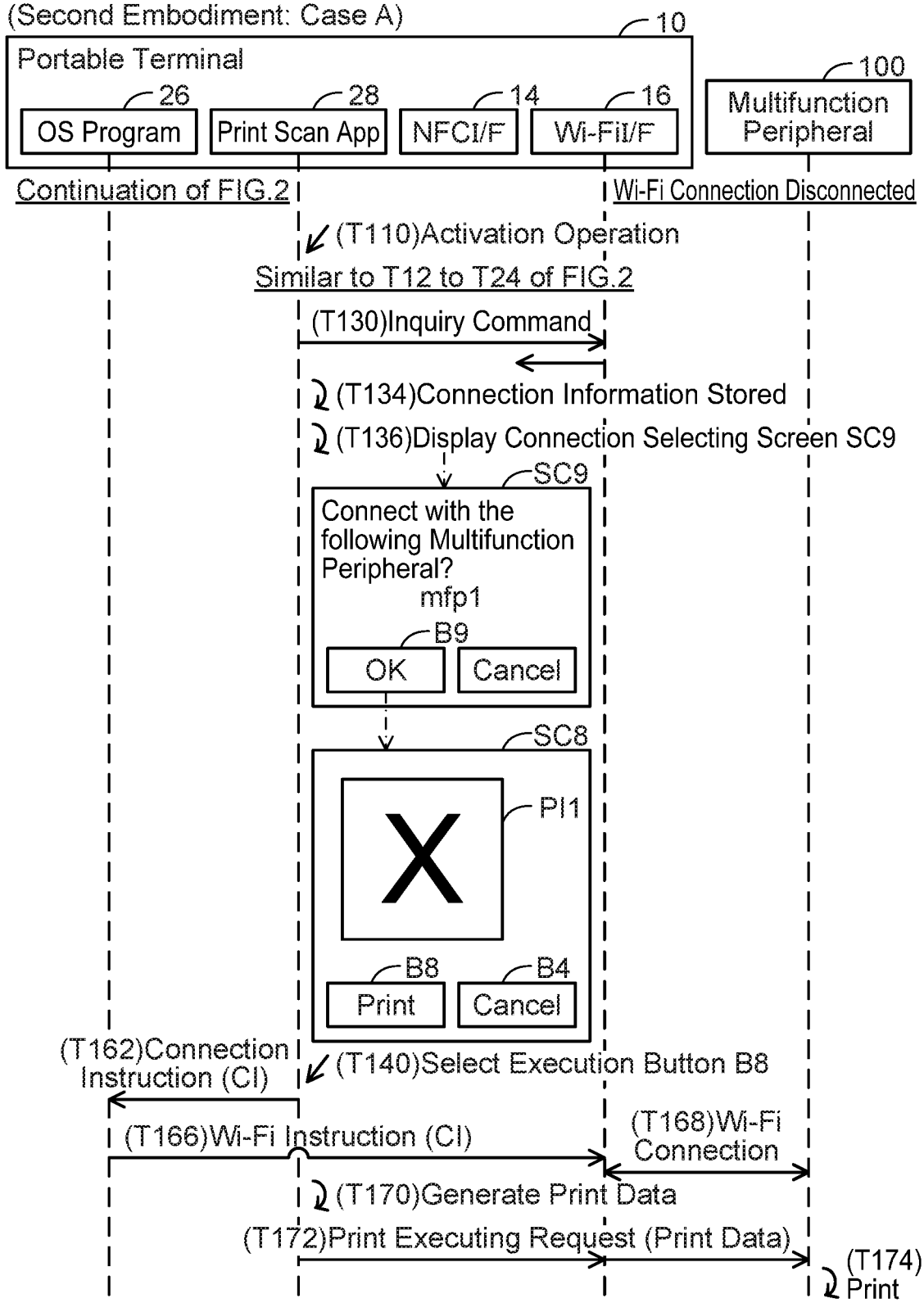
FIG. 5 shows a sequence diagram of Case A in which a Wi-Fi connection is not being established.
Figure 6:
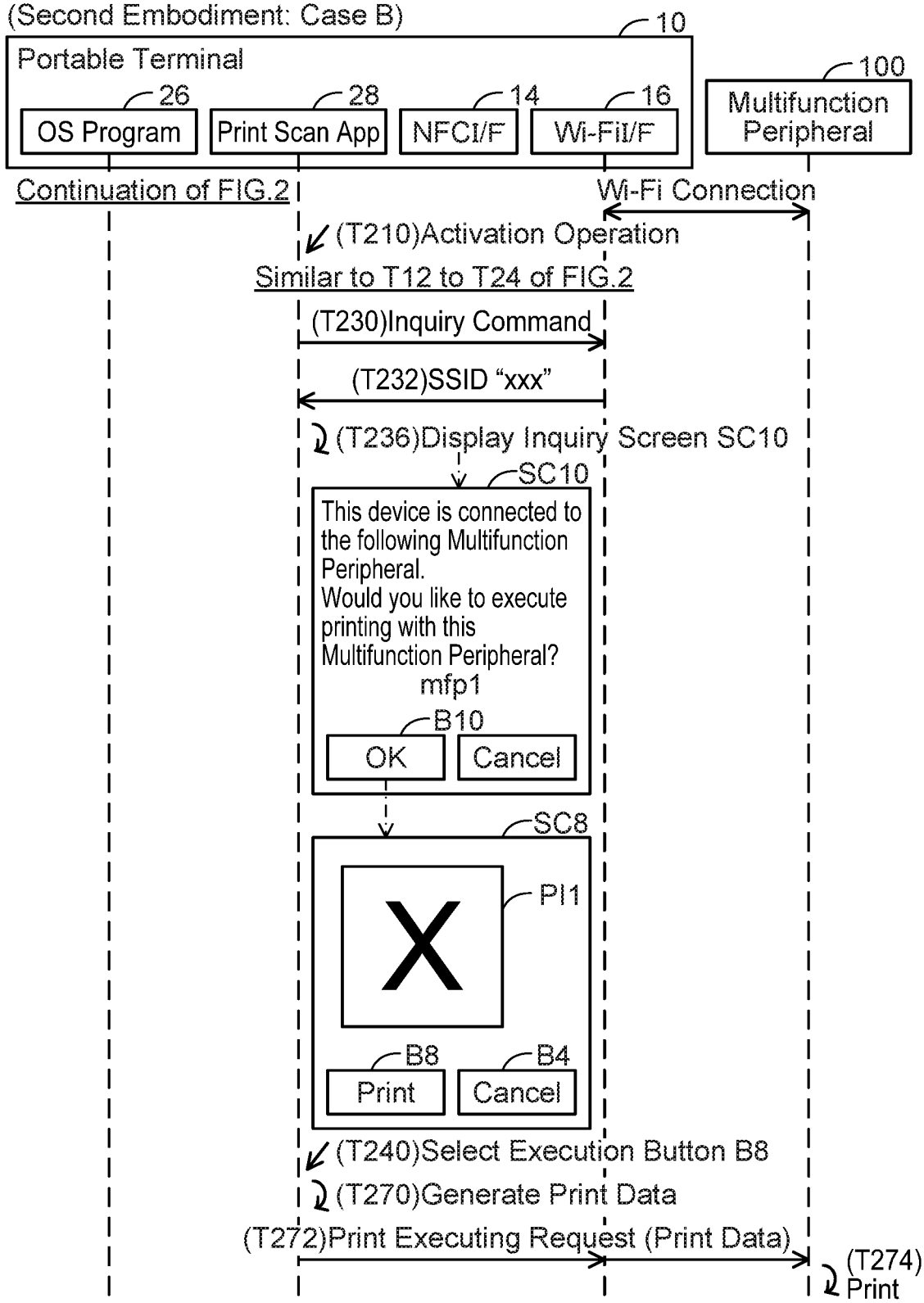
FIG. 6 shows a sequence diagram of Case B in which a Wi-Fi connection is being established.

(Specific Cases A and B; FIGS. 5 and 6)

Specific cases realized by the process of FIG. 4 will be described. In Case A of FIG. 5, after processes similar to T12 to T72 of FIG. 2 have been executed by the processes of S8 to S16 and S40 of FIG. 4, the Wi-Fi connection established in T68 of FIG. 2 is disconnected due to a power of the multifunction peripheral 100 being turned off or the like. Since there is a past record of the Wi-Fi connection having been established with the multifunction peripheral 100, the memory 24 stores the connection information CI in T58 of FIG. 2.

In T110, the operation to activate the app 28 is performed again by the user. Due to this, processes similar to T12 to T24 of FIG. 2 are executed (S8 of FIG. 4).

In T130, the app 28 supplies the inquiry command to the Wi-Fi I/F 16. In the present case, since no Wi-Fi connection is currently established, the app 28 does not obtain a response including an SSID from the Wi-Fi I/F 16, as a result of which it determines that a Wi-Fi connection is not currently established with the multifunction peripheral 100 (NO in S10).

Next, the app 28 determines that the connection information CI is stored in the memory 24 in T134 (YES in S12). In T136, the app 28 causes the display unit 12 to display a connection selecting screen SC9 (S20). Here, upon storing the connection information CI, the memory 24 further stores a model name "mfp1" of the multifunction peripheral 100. The app 28 causes the display unit 12 to display the connection selecting screen SC9 including the model name "mfp1" of the multifunction peripheral 100. Then, when an OK button B9 in the connection selecting screen SC9 is selected (YES in S22), the app 28 causes the display unit 12 to display the preview screen SC8 (S24).

In T140, the app 28 accepts the selection of the execution button B8 in the preview screen SC8 (YES in S26). Due to this, the app 28 supplies the connection instruction including the connection information CI to the OS program 26 in T162 (S28). T166 to T174 are similar to T66 to T74 of FIG. 2. In the present case as well, processes similar to T60 and T64 of FIG. 2 are executed after the process of T140, however, depiction thereof is omitted in FIG. 5.

In the present case, in the case where the connection information CI is stored in the memory 24 (T134) due to the Wi-Fi connection having been established with the multifunction peripheral 100 in the past, the portable terminal 10 establishes the Wi-Fi connection by using the stored connection information CI (T168). That is, the portable terminal 10 can establish the Wi-Fi connection without supplying the communication executing instruction for establishing the NFC connection to the OS program 26. Due to this, the user does not have to bring the portable terminal 10 close to the multifunction peripheral 100, thus user convenience is improved. Further, since the communication via the NFC I/F 14 does not have to be executed, the Wi-Fi connection with the multifunction peripheral 100 can promptly be established. In the present case, the Wi-Fi connection in T168 of FIG. 5 and the connection information CI are respectively examples of "fourth wireless connection" and "past-record information".

(Case B; FIG. 6)

In Case B of FIG. 6, the Wi-Fi connection established in T68 of FIG. 2 is maintained without being disconnected after a process similar to that of FIG. 2 has been executed.

T210 is similar to T110 of FIG. 5. Due to this, processes similar to T12 to T24 of FIG. 2 are executed. T230 is similar to T130 of FIG. 5. In the present case, since the Wi-Fi connection is currently established, the app 28 obtains a response including the SSID "xxx" from the Wi-Fi I/F 16 and determines that the Wi-Fi connection is currently established with the multifunction peripheral 100 (YES in S10).

In T236, the app 28 causes the display unit 12 to display an inquiry screen SC10 (S30 of FIG. 4). Then, when an OK button B10 in the inquiry screen SC10 is selected (YES in S32), the app 28 causes the display unit 12 to display the preview screen SC8 (S34). T240 to T274 are similar to the T140 to T174 of FIG. 5 except that the Wi-Fi connection established in the process of FIG. 2 is used.

In the present case, in the case where the Wi-Fi connection is currently established between the portable terminal 10 and the multifunction peripheral 100 (T232), the portable terminal 10 sends the print executing request to the multifunction peripheral 100 by using this Wi-Fi connection. That is, the portable terminal 10 can send the print executing request to the multifunction peripheral 100 without supplying the communication executing instruction for establishing the NFC connection to the OS program 26 and further without executing the processes to establish the Wi-Fi connection. Due to this, the user does not have to bring the portable terminal 10 close to the multifunction peripheral 100, thus the user convenience is improved. Further, since the communication via the NFC I/F 14 and the communication for establishing the Wi-Fi connection do not have to be executed, the print executing request can promptly be sent to the multifunction peripheral 100. In the present case, the Wi-Fi connection established in an initial state of FIG. 6 is an example of "third wireless connection".

(Variant 1) The Wi-Fi I/F 16 of the portable terminal 10 may support the WFD scheme. In this case, the portable terminal 10 may operate in the CL state of the WFD scheme in T68 of FIG. 2, and may establish a wireless connection according to the WFD scheme with the multifunction peripheral 100. In this variant, the wireless connection according to the WFD scheme is an example of "second wireless connection".

(Variant 2) In each of the above embodiments, the portable terminal 10 receives the SSID for identifying the Wi-Fi network from the multifunction peripheral 100 in T52 of FIG. 2. Instead of this, the portable terminal 10 may receive an SSID for identifying an AP network in which an Access Point (AP) participates as a parent station and the multifunction peripheral 100 participates as a child station, from the multifunction peripheral 100. Further, in T68 of FIG. 2, the portable terminal 10 may establish a wireless connection with the AP by using the SSID of the AP network. The portable terminal 10 may send the print executing request to the multifunction peripheral 100 in T72 via the AP by using the wireless connection established with the AP. In this variant, the wireless connection established with the AP is an example of "second wireless connection".

(Variant 3) In each of the above embodiments, the portable terminal 10 receives the connection information CI from the multifunction peripheral 100 by using the NFC connection (T52 of FIG. 2). Instead of this, the portable terminal 10 may send an SSID and a password for causing the multifunction peripheral 100 to participate as a child station in a Wi-Fi network in which the portable terminal 10 operates as a parent station, to the multifunction peripheral 100 by using the NFC connection. Further, in T68 of FIG. 2, the portable terminal 10 may establish a Wi-Fi connection with the multifunction peripheral 100 by using the SSID and the password to cause the multifunction peripheral 100 to participate in the Wi-Fi network as the child station. In this variant, the SSID and the password sent from the portable terminal 10 to the multifunction peripheral 100 are an example of "connection information".

(Variant 4) In each of the above embodiments, the NFC screen SC5 is displayed in front of the preview screen SC4. Instead of this, the NFC screen SC5 may be displayed after the preview screen SC4 has been closed. In this variant, displaying the NFC screen SC5 after the preview screen SC4 has been closed is an example of "causing a display unit to display a predetermined screen preferentially over a confirmation screen".

(Variant 5) The preview screen SC4 of FIG. 3 may not be displayed. In this variant, "causing a display unit to display a confirmation screen" may be omitted.

(Variant 6) In T26 of FIG. 2, the portable terminal 10 may supply the communication executing instruction to the OS program 26 immediately after the preview screen SC4 is displayed without waiting for the predetermined time to elapse since the preview screen SC4 began to be displayed.

(Variant 7) The NFC screen SC5 of FIG. 3 may not be displayed. In this variant, the OS program may not cause the display unit to display the predetermined screen.

(Variant 8) "First wireless interface" may not be an I/F for executing the NFC communication, and may be an I/F, for example, for executing wireless communication according to another communication scheme such as BlueTooth (registered trademark), infrared, or TransferJet. Further, "second wireless interface" may not be an I/F for executing the wireless communication according to the Wi-Fi scheme, and may be an I/F, for example, for executing wireless communication according to another communication scheme such as Bluetooth.

(Variant 9) In each of the above embodiments, the respective processes of FIGS. 2 to 6 are executed by the CPU 22 of the portable terminal 10 executing the print scan application 28 (that is, software). Instead of this, one or more of the processes may be implemented by hardware such as logic circuits.

What is claimed is:

1. A non-transitory computer-readable medium storing computer-readable instructions for a terminal device, the computer-readable instructions, when executed by a processor of the terminal device, causing the terminal device to:

in a case where an instruction for using a specific function executable by a function executing device is inputted, cause a display unit of the terminal device to display a setting screen for inputting setting information for executing the specific function;

before the terminal device communicates with the function executing device via a first wireless interface of the terminal device, determine whether past-record information is stored in a memory of the terminal device, the past-record information indicating that there is a past record of a specific wireless connection having been established via a second wireless interface of the terminal device, the second wireless interface being different from the first wireless interface, the specific wireless connection being for communicating with the function executing device;

in a case where it is determined that the past-record information is not stored in the memory and the setting information is inputted in the setting screen, supply a communication executing instruction to an operating system (OS) program of the terminal device, the communication executing instruction being for instructing to execute communication via the first wireless interface, the communication executing instruction being not supplied to the OS program before the setting information is inputted in the setting screen, wherein the OS program supplies a signal sending instruction to the first wireless interface in response to obtaining the communication executing instruction, the first wireless interface starts sending a polling signal in response to obtaining the signal sending instruction, establishes a first wireless connection with the function executing device in response to sending the polling signal to the function executing device, and communicates connection information with the function executing device by using the first wireless connection, and the OS program establishes, by using the connection information, a second wireless connection for communicating with the function executing device via the second wireless interface of the terminal device; and in a case where the second wireless connection is established, send a function executing request to the function executing device via the second wireless interface by using the second wireless connection, the function executing request being for causing the function executing device to execute the specific function according to the setting information, in a case where it is determined that the past-record information is stored in the memory, supply a connection instruction to the OS program without supplying the communication executing instruction to the OS program, wherein in response to obtaining the connection instruction, the OS program establishes the specific wireless connection via the second wireless interface by using the past-record information; and in a case where the specific wireless connection is established, send the function executing request to the function executing device via the second wireless interface by using the specific wireless connection.

2. The non-transitory computer-readable medium as in claim 1, wherein
the OS program establishes, by using the connection information, the second wireless connection with the function executing device via the second wireless interface.

3. The non-transitory computer-readable medium as in claim 1, wherein
the computer-readable instructions, when executed by the processor of the terminal device, further cause the terminal device to:
in a case where the setting information is inputted in the setting screen, cause the display unit to display a confirmation screen for the setting information; and
after a predetermined time has elapsed since the confirmation screen was displayed, the communication executing instruction is supplied to the OS program.

4. The non-transitory computer-readable medium as in claim 3, wherein
the OS program causes the display unit to display a predetermined screen preferentially over the confirmation screen in response to obtaining the communication executing instruction, the predetermined screen indicating that the communication via the first wireless interface is executable.

5. The non-transitory computer-readable medium as in claim 1, wherein
the computer-readable instructions, when executed by the processor of the terminal device, further cause the terminal device to:
after the setting information has been inputted in the setting screen, determine whether a third wireless connection is currently established via the second wireless interface, the third wireless connection being for communicating with the function executing device; and
in a case where it is determined that the third wireless connection is currently established, send the function executing request to the function executing device via the second wireless interface by using the third wireless connection, without supplying the communication executing instruction to the OS program,
wherein in a case where it is determined that the third wireless connection is not currently established:
the communication executing instruction is supplied to the OS program; and
the function executing request is sent to the function executing device via the second wireless interface by using the second wireless connection.

6. The non-transitory computer-readable medium as in claim 1, wherein
the first wireless interface is configured to execute a wireless communication according to a Near Field Communication (NFC) scheme, and
the second wireless interface is configured to execute a wireless communication according to a Wi-Fi scheme.

7. A terminal device comprising:
a display unit;
a first wireless interface;
a second wireless interface being different from the first wireless interface;
a processor; and
a memory storing computer-readable instructions therein, the computer-readable instructions, when executed by the processor, causing the terminal device to:
in a case where an instruction for using a specific function executable by a function executing device is inputted, cause the display unit to display a setting screen for inputting setting information for executing the specific function;
before the terminal device communicates with the function executing device via the first wireless interface, determine whether past-record information is stored in a memory of the terminal device, the past-record information indicating that there is a past record of a specific wireless connection having been established via the second wireless interface of the terminal device, the specific wireless connection being for communicating with the function executing device;
in a case where it is determined that the past-record information is not stored in the memory and the setting information is inputted in the setting screen, supply a communication executing instruction to an operating system (OS) program of the terminal device, the communication executing instruction being for instructing to execute communication via the first wireless interface, the communication executing instruction being not supplied to the OS program before the setting information is inputted on the setting screen,
wherein the OS program supplies a signal sending instruction to the first wireless interface in response to obtaining the communication executing instruction,
the first wireless interface starts sending a polling signal in response to obtaining the signal sending instruction, establishes a first wireless connection with the function executing device in response to sending the polling signal to the function executing device, and communicates connection information with the function executing device by using the first wireless connection, and
the OS program establishes, by using the connection information, a second wireless connection for communicating with the function executing device via the second wireless interface; and
in a case where the second wireless connection is established, send a function executing request to the function executing device via the second wireless interface by using the second wireless connection, the function executing request being for causing the function executing device to execute the specific function according to the setting information
in a case where it is determined that the past-record information is stored in the memory, supply a connection instruction to the OS program without supplying the communication executing instruction to the OS program,
wherein in response to obtaining the connection instruction, the OS program establishes the specific wireless connection via the second wireless interface by using the past-record information; and
in a case where the specific wireless connection is established, send the function executing request to the function executing device via the second wireless interface by using the specific wireless connection.

* * * * *